April 22, 1941.  H. G. SPEAR  2,239,661
ARC APPARATUS
Filed Jan. 13, 1940  4 Sheets-Sheet 1

INVENTOR.
HOWARD G. SPEAR,
BY W. L. Beatty
ATTORNEY.

April 22, 1941.　　　H. G. SPEAR　　　2,239,661
ARC APPARATUS
Filed Jan. 13, 1940　　　4 Sheets-Sheet 2

INVENTOR.
HOWARD G. SPEAR,
BY W. E. Beatty
ATTORNEY.

April 22, 1941. H. G. SPEAR 2,239,661
ARC APPARATUS
Filed Jan. 13, 1940 4 Sheets-Sheet 3

INVENTOR.
HOWARD G. SPEAR,
BY W. U. Beatty
ATTORNEY.

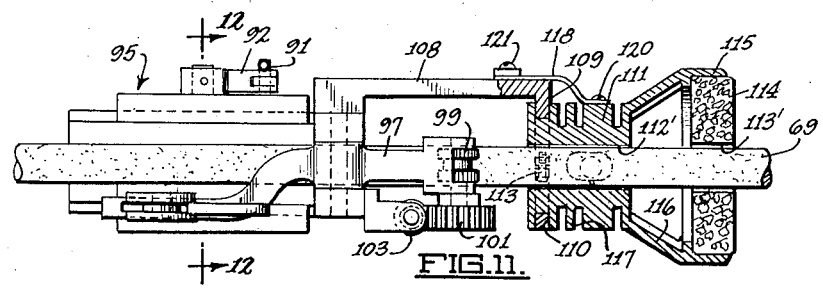
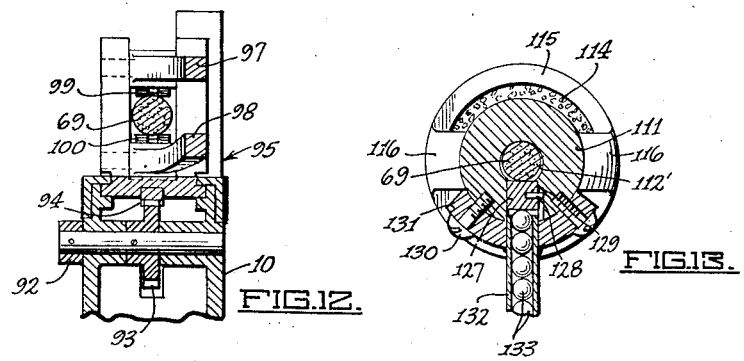
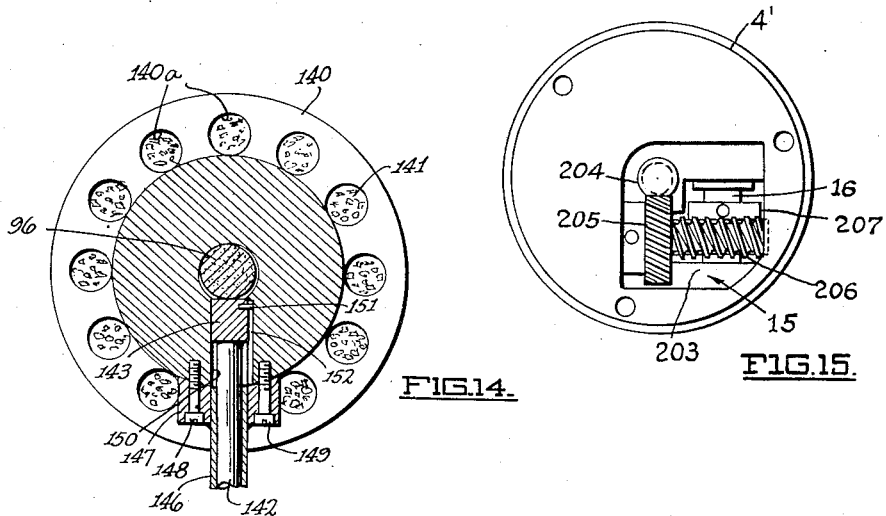

Patented Apr. 22, 1941

2,239,661

UNITED STATES PATENT OFFICE 2,239,661

ARC APPARATUS

Howard G. Spear, North Hollywood, Calif., assignor, by direct and mesne assignments, to William E. Beatty, Los Angeles, Calif.

Application January 13, 1940, Serial No. 313,729

17 Claims. (Cl. 176—55)

My invention relates to electric arc apparatus wherein two carbon electrodes are fed to the arc by means of negative and positive heads.

While a motor common to both heads has been employed heretofore for operating the heads to feed the carbons, the motor drive has been rather complicated. One object of the invention is to simplify the motor drive for the heads.

Also, it has been found that the terrific heat generated by the arc results in damage to the heads. Another object of the invention is to reduce such damage.

A further object is to facilitate manual feed of the electrodes.

Another object is to independently adjust the rate of automatic feed of each electrode.

For further details of the invention reference may be made to the drawings wherein.

Figure 6:
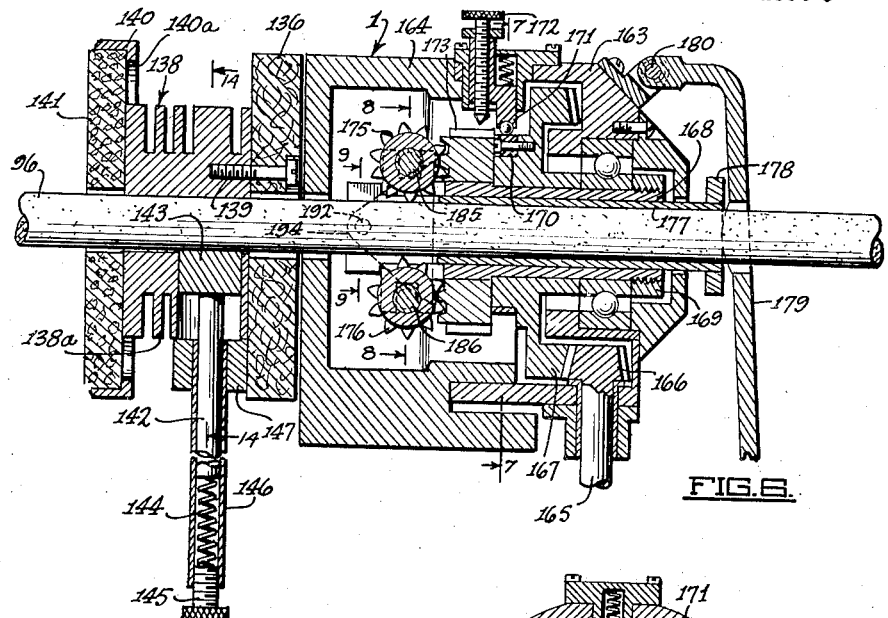
Fig. 6 is an enlarged vertical sectional view of the positive head of Fig. 1.
Figure 8:
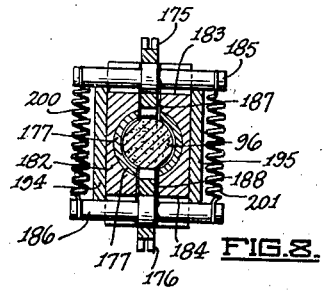
Figure 7:
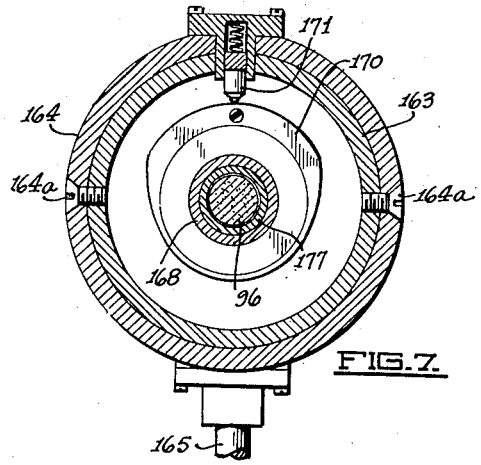
Figure 9:
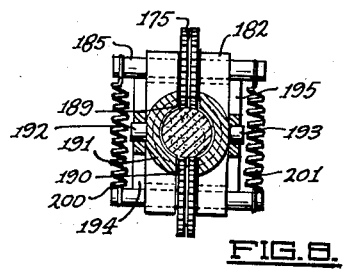

Figs. 7, 8, and 9 are sectional views on lines 7—7; 8—8; 9—9 respectively of Fig. 6.

Figure 10:
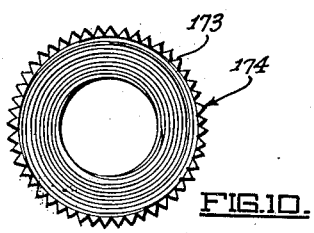

Fig. 10 is a plan view of the scroll gear of Fig. 6.

Figure 1:
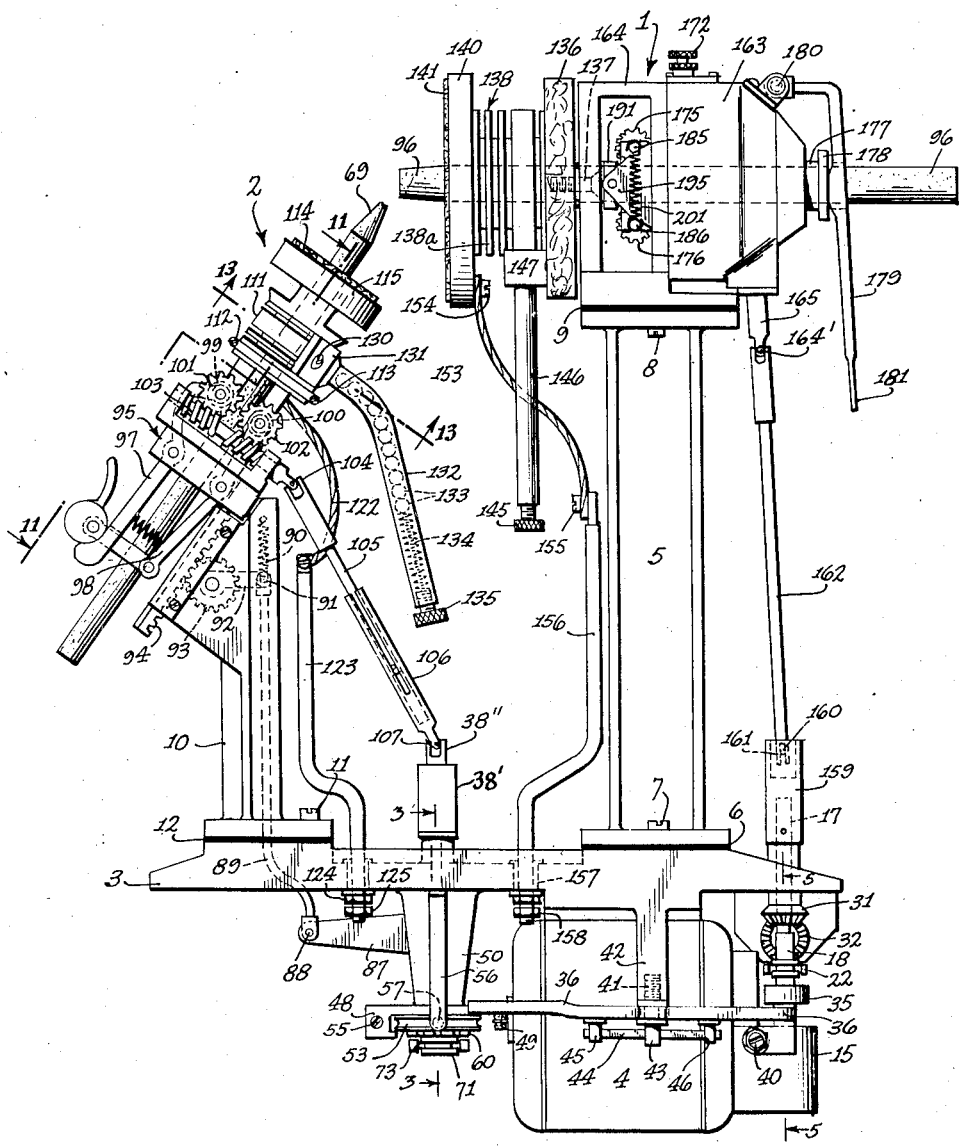
Fig. 1 is a front elevation of electric arc apparatus according to the invention.

Fig. 11 is a partial sectional view on line 11—11 of Fig. 1.

Fig. 12 is a section on line 12—12 of Fig. 11.

Fig. 13 is a section on line 13—13 of Fig. 1.

Fig. 14 is a section on line 14—14 of Fig. 6.

Fig. 15 is a rear elevational view of the reduction gearing.

Referring to the drawings, the arc light of Fig. 1 may be mounted in a suitable casing having a reflector not shown, and comprises a positive head 1 and a negative head 2 mounted on a base 3 and operated by a motor 4 mounted beneath base 3. Head 1 is carried by a pedestal 5 which is secured to base 3 by bolts like 7 and insulated from base 3 by insulation 6. Head 1 is secured to the top of pedestal 5 by bolts like 8 and insulated from pedestal 5 by insulation 9. Head 2 is mounted on pedestal 10 which is secured to the top of base 3 by bolts like 11 and insulated from base 3 by insulation 12.

Figure 5:
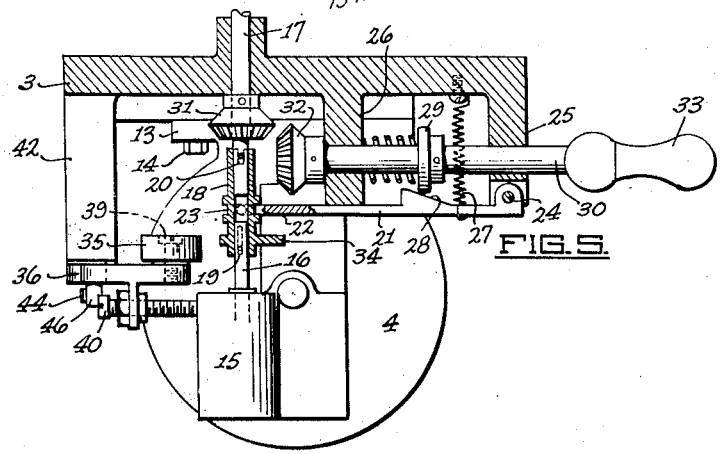
Fig. 5 is a sectional view on line 5—5 of Fig. 1.

The base 13 of motor 4 bears against the underside of base 3 and is secured thereto by bolts like 14 (Fig. 5). Motor 4 carries and is coupled to a reduction gear 15 having a ratio of 60 to 1 and having a slow speed driven shaft 16. For example, if motor 4 runs at 1725 R. P. M., shaft 16 will run at about 28 R. P. M. Referring to Fig. 15, the end bell 4' of the motor 4 is provided with a recess 203 in which the reduction gearing 15 is housed. Centrally of the end bell 4' and at the bottom of recess 203 is a circular recess 204 which serves as a bearing for the end of the motor shaft not shown. This motor shaft carries a worm gear not shown which meshes with the worm gear 205 which drives the worm 206. Below worm 206 is a worm gear 207, the hub of which can be seen extending above worm 206. Worm gear 207 is mounted on the shaft 16. The motor shaft not shown thus drives the shaft 16 through the reduction gearing comprising a worm not shown on the motor shaft, worm gear 205, worm 206 and worm gear 207.

Rotatably mounted in base 3 directly above driven shaft 16 is the positive electrode drive shaft 17. Shafts 16 and 17 are coupled or uncoupled by the slidable coupling 18. The lower end of coupling 18 is rotatably fixed to shaft 16 by the pin and slot 19 while the upper end of coupling 18 may be moved into or out of rotating engagement with shaft 17 by means of the pin and slot 20. Coupling 18 is slid up or down by lever 21 having a forked end 22 which lies in a groove 23 in coupling 18. Lever 21 is pivoted at 24 to flange 25 depending from base 3. Lever 21 is held against depending flange 26 by spring 27. The top of lever 21 carries a cam 28 adapted to be engaged by shoulder 29 on shaft 30 which is slidably and rotatably mounted in flanges 25 and 26. The positive electrode drive shaft 17 carries a gear 31 engageable with gear 32 on shaft 30 when the latter is moved to the left by handle 33, this movement causing shoulder 29 acting on cam 28 to depress lever 21 and uncouple shafts 16 and 17 whereby shaft 17 is disconnected from motor 4 and connected to shaft 30 to feed the positive electrode by hand.

Slow speed driven shaft 16 serves also to drive the negative head and for this purpose coupling 18 carries an eccentric 34 adapted at times in its rotation to engage follower 35 on lever 36 (Fig. 2), to oscillate that lever and actuate slip clutch or one-way clutch 37 to rotate the negative electrode drive shaft 38 (Fig. 3) step by step. Follower 35 is shown as a disk rotatably secured to one end of lever 36 by a bolt 39.

Figure 2:
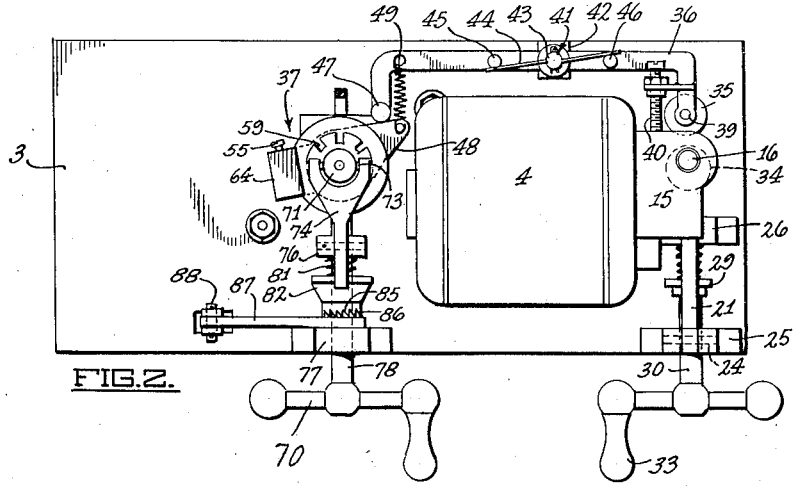
Fig. 2 is a plan view looking upward at the bottom of the apparatus of Fig. 1.

Adjacent follower 35 and mounted on one end of lever 36 is an adjustable stop screw 40 which limits the movement of follower 35 towards eccentric 34 by engaging the casing of the reduction gearing 15 as shown in Figs. 2 and 5. Lever 36 is pivoted intermediate its ends at 41 to a flange 42 depending from the base 3 which carries a stud 43 which serves as a pivot and stud 43 has a leaf spring 44 which engages projections 45 and 46 at opposite sides of the pivot 41 to urge the lever 36 in a clockwise direction so that stop 40 will engage the casing of gearing 15 at times when eccentric 34 is out of engagement with follower 35.

Figures 3, 4:
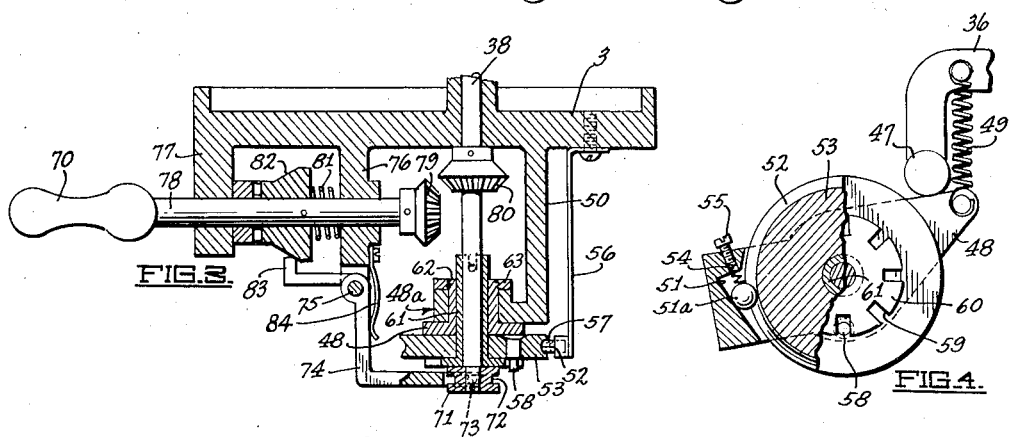
Fig. 3 is a section on line 3—3 of Fig. 1. In this figure and others the sectional view is in the direction of the arrows.
Fig. 4 is an enlarged partial sectional view of the slip clutch shown at the left of Fig. 2.

The other end of lever 36 is provided with a projection 47 adapted to engage the lever arm 48 which is rotatably mounted in a bearing 48a (Fig. 3) in the horizontal extension of the flange 50 depending from the underside of base 3. When projection 47 moves downwardly it rotates the lever arm 48 clockwise as seen in Figs. 2 and 4, and when projection 47 moves up, the lever arm 48 is rotated in a counter-clockwise direction by reason of the spring 49 connected between the lever arm 48 and the left end of lever 36. One side of lever arm 48 is provided with a tapered bore 51 in which is mounted a ball 51a which rides partly in a race way 52 in disk 53. Ball 51a is urged towards the narrow part of bore 51 by means of spring 54, the tension of which can be adjusted by screw 55 mounted at one side of the lever arm 48. When arm 48 is rotated clockwise, as seen in Fig. 4, ball 51a is wedged in the narrow part of bore 51 and serves to couple lever arm 48 to disk 53 to rotate them together. When lever arm 48 is rotated counter-clockwise as seen in Fig. 4, ball 51a moves into the larger part of bore 51 so that disk 53 is not rotated thereby. The throw of lever 36, acting through slip clutch 37 thus determines the amount that the negative electrode 69 is fed forward each time, and the stop screw 40 makes it possible to adjust the amount of this feed to a very fine degree. Rotation of disk 53 is frictionally retarded by spring pressed brake 56 having a shoe 57 engaging groove 52. Disk 53 carries one or more pins 58 adapted to be embraced by slots 59 in the flange 60 on sleeve 61 which is rotatably mounted in the bore of lever arm 48, as shown in Figs. 3 and 4.

Lever arm 48, as shown in Fig. 3, has a vertical sleeve 62 surrounding sleeve 61. Sleeve 62 has its upper end threaded and provided with a nut 63, this nut resting on the top of the horizontal bearing portion of flange 50, and the top of lever arm 48 engages the under portion of this horizontal flange whereby the arm 48 is restrained from vertical movement. Also disk 53 is restrained from vertical movement by reason of the fact that the top of it lies against the underside of lever arm 48, and its underside lies above overhanging flange 64 on arm 48, as shown in Fig. 2. The sleeve 61 however is slidable in sleeve 62 and disk 53 and when moved downwardly sleeve 61 is uncoupled from the negative electrode drive shaft 38 at the pin and slot 20 and also sleeve 61 is uncoupled from disk 53 since the notches 59 will extend below and not engage pins 58. The purpose of thus disconnecting shaft 38 from the slip clutch 37 is to disconnect shaft 38 from motor 4 and permit shaft 38 to be operated by the handle 70 so that the negative electrode may be fed by hand. Shaft 38 at its lower end carries a collar 71 having a groove 72 in which rides the forked end 73 of lever 74 pivoted at 75 to flange 76 which depends from the base 3. Depending from base 3 is another flange 77 and the shaft 78 upon which handle 70 is mounted is slidably and rotatably mounted in flanges 76 and 77. Shaft 78 carries gear 79 adapted to be engaged with gear 80 on shaft 38. When shaft 78 is moved to the right, shaft 78 is urged to the left by a spring 81 between one side of flange 76 and the cam 82 which is fixed on shaft 78. Lever 74 has a projecting end 83 adapted to rest on and be actuated by cam 82. When shaft 78 is moved to the right, the end 83 of lever 74 rides down the surface of cam 82 under action of spring 84 so that lever 74 moves in a clockwise direction to uncouple shaft 38 from motor 4 as above described. When shaft 78 is moved manually or by spring 81 to the left, shaft 38 is coupled to motor 4.

The handle 70 may also be used to advance the negative electrode 69 to strike the arc as follows; cam 82 is provided on its front face with a series of teeth 85 having flat faces extending longitudinally of cam 82 as shown. A corresponding set of teeth 86 are formed on lever 87 which loosely fits on shaft 78. Lever 87 is pivotally connected at 88 to rod 89 (Fig. 1) which is normally pulled upwards by spring 90 connected to rod 89 and to the pedestal 10. At its top, rod 89 is pivotally connected at 91 to a lever 92 (Figs. 1 and 12) fixed to a rotatable pinion 93, meshing with rack 94 on the carriage 95 of the negative electrode 69. When the handle 70, as shown in Fig. 2, is rotated counter-clockwise, the teeth 85 slide over teeth 86 without rotating lever 87 about shaft 78. When handle 70 is pulled out as shown and is rotated clockwise, the flat faces of teeth 85 and 86 engage to cause lever 87 to move about shaft 78 as a pivot, whereby lever 87 is moved downwards as seen in Fig. 1, and the negative electrode 69 is moved to contact the positive electrode 96 whereupon the release of handle 70 will permit spring 90 to rotate pinion 93 counter-clockwise and separate the electrodes to strike the arc.

Carriage 95 has pivotally mounted thereon two levers 97 and 98 carrying at their front ends feed wheels 99 and 100 respectively, as shown in Figs. 11 and 12, and the latter are operated by pinions 101 and 102 (Fig. 1), the latter meshing with worm 103, as is well known. Worm 103 is connected through a flexible coupling 104 to shaft 105 which has a slidable coupling 106 and flexible coupling 107 with shaft 38″ connected through removable insulating coupling 38′ (like coupling 159) with shaft 38 (Fig. 3).

Projecting from the front of carriage 95, as shown in Fig. 11, is an arm 108 terminating in a two piece ring 109 which engages a circular groove 110 in the terminal block 111. The two parts of the ring 109 are held together by screws 112 and 113, as shown in Figs. 1 and 11. Arm 108 is slightly wider than the distance between the centers of pinions 102 and 101, as shown in Fig. 1. Terminal block 111 has an aperture 112′ to receive the carbon 69 and in alignment therewith is an aperture 113′ in a disk 114 of carborundum carried by a ring 115, supported by outwardly extended arms 116 projecting from the end of terminal block 111. The latter has one or more radiating flanges 117, as shown. Terminal block 111 is electrically connected to arm 108 by conductor 118, fastened to block 111 by screw 120 and to arm 108 by screw 121 which also makes contact with the top end of flexible conductor 122 (Fig. 1) arising from bus bar 123 which is insulatingly mounted in base 3 and secured thereto by nut 124, companion nut 125 serving to retain the lug not shown of one side of a power line. The provision of extended arm 108 with terminal block 111 thereon having flanges 117 and with an air space between terminal block 111 and the insulating material 114 all contribute to insulate the feed wheels 99 and 100 and associated parts from the heat of the arc.

As shown in Figs. 1 and 13, the terminal block 111 is provided with the following means to resiliently hold the electrode 69 in electrical contact with terminal block 111. Underneath terminal block 111 there is provided an aperture in which is slidably mounted a shoe 127 having a pin 128 riding in groove 129 to prevent rotation of the shoe. Secured underneath terminal block 111 by means of bolts 130 is an arcuate flange 131 which has secured thereto as by soldering, a metal tube 132 carrying a series of balls 133, the upper one of which bears against shoe 127 and against the lower one of which bears a spring 134 as shown in Fig. 1. Mounted in the end of tube 132 is an adjusting screw 135 to vary the pressure on spring 134 and vary the pressure of shoe 127 on electrode 69. If it is convenient to have tube 132 project straight from terminal block 111 as later described in connection with the positive head, the spring follower may take the form of a rod instead of a series of balls 133. By providing a spring follower, it is possible to have the spring 134 positioned a substantial distance away from the electrode 69 thereby preventing the heat of that electrode from removing the temper from the spring.

The feed mechanism for the positive head is substantially the same as that shown in the U. S. patent to Anderson 2,173,149 issued September 19, 1939. Some differences comprise an improved form of terminal block and the provision of an electrode release.

To protect the positive head from the heat of the arc, as shown in Figs. 1 and 6, I support a disk 136 of insulating material at the front of the positive head 1, by means of screws like 137. Secured to the front of disk 136, is terminal block 138 secured thereto by screws like 139 in Fig. 6. Terminal block 138 has radiating flanges 138a and it terminates in a ring 140 carrying a disk of carborundum 141. Between ring 140 and the body portion of terminal block 138, as shown in Fig. 14, is a circular array of holes 140a to facilitate radiation of heat from the carborundum disk 141. The terminal block 138 and the disks 136 and 141, of course, have central aligned apertures for the positive electrode 96. The contact shoe for terminal block 138 is similar to that provided for the negative electrode except that a follower 142, in the form of a rod, is used instead of a series of balls. Rod 142 bears against contact shoe 143, as shown in Figs. 6 and 14 in order to urge the electrode 96 against the terminal block 138, acting under control of spring 144 the tension of which may be adjusted by screw 145. Rod 142, spring 144, and screw 145 are mounted in tube 146 soldered to arcuate block 147 which is secured to the underside of terminal block 138 by bolts 148 and 149. Shoe 143 rides in aperture 150 in terminal block 138 and it has a pin 151 riding in a groove 152 to prevent its rotation.

Electric current is fed to the positive electrode 96 by flexible conductor 153 which is secured to ring 140 by screw 154. The lower end of flexible conductor 153 is connected at 155 to the top of a bus bar 156 suitably insulated from and secured to the base 3 as generally represented at 157. One side of the power line is connected to the bus bar 156 by means of nut 158.

The positive electrode drive shaft 17 has fixed thereto a sleeve 159 carrying a pin 160 embraced by the forked end 161 of shaft 162 in order to provide a slip coupling to permit the casing 163 to be removed. Shaft 162 has a universal joint 164' connected with the stub shaft 165 on which a pinion 166 in Fig. 6 is mounted. Casing 163 is secured to casing 164 of the positive head 1, by means of bolts 164a as shown in Fig. 7. The bolts 8 shown in Fig. 1 hold the casing 164 to pedestal 5 so that the latter may be left in position on pedestal 5 and casing 163 removed from casing 164 by removing bolts 164a, as described in the above mentioned patent. Pinion 166 meshes with gear 167 fixed to tubular member 168 by means of the clamping action of nut 169 as described in the above patent. Gear 167 carries a cam 170 having a cam follower 171 which, at certain times, allows adjusting screw 172 to engage the teeth 173 of a scroll gear 174 to arrest the rotation of the same and cause the feed wheels 175 and 176 to rotate in a planetary manner about their own axes to propel forward the carbon 96 as described in the above patent. According to the present invention, provision is made for the release of the feed wheels 175 and 176 as follows; inside of tubular member 168 is mounted a sleeve 177 carrying an enlarged head 178 against which the lever 179 is adapted to bear so that when lever 179 which is pivoted to casing 163 at 180, is moved to the left by handle 181, the sleeve 177 which is slidably mounted in tube 168, will be moved to the left to push the feed wheels 175 and 176 away from the electrode 96, or away from the bore of sleeve 177 so that an electrode may be inserted in the positive head without injury due to gouging by the feed wheels 175 and 176. Sleeve 168 carries an operating head 182 which terminates substantially within the periphery of the feed wheels 175 and 176, as shown in the dotted lines in Fig. 6. Operating head 182, as in the above patent, has cross slots 183 and 184 for the feed wheel shafts 185 and 186 respectively, as well as longitudinal slots 187 and 188, which house the feed wheels 175 and 176 so that they may bear against the electrode 96. In line with the slots 187 and 188, I provide slots 189 and 190 in the operating head 191 on sleeve 177. As shown in Fig. 9 and also in Fig. 6 in dotted lines, the head 191 at opposite sides, carries pins or stub shafts 192 and 193 on which are pivotally mounted and therefore self-centering, wedge plates 194 and 195 respectively. One of these plates 195 is shown in dotted lines in Fig. 6. The wedge plates 194 and 195 are prevented from sliding off from their respective pins 192 and 193 by the springs 200 and 201 respectively. As shown in Fig. 8, the wedge plates 194 and 195 are flat and bear against the opposite outside flat faces of the head 182. Also wedge plates 194 and 195, as shown in Fig. 8, extend between the shafts 185 and 186 and have such a width that when they are urged to the left, the shafts 185 and 186 ride on the surfaces of those wedge plates, the shafts 185 and 186 moving outwardly in their respective slots 183 and 184, against the action of springs 200 and 201 until the feed rollers 175 and 176 are separated sufficiently to clear the electrode 96. When handle 181 is released, the tension of springs 200 and 201 acting in conjunction with the slope of the wedge surfaces of the wedge plates 194 and 195 is sufficient to move those wedge plates and tube 177 to the right until the feed rollers 175 and 176 contact the electrode 96, or until the shafts 185 and 186 come to rest at the bottom of their respective slots 183 and 184.

It will be understood that by varying the setting of the stop screw 40, in Figs. 2 and 5, the extent of movement and therefore the speed of the step-by-step movement of the negative electrode drive shaft 38 will be correspondingly varied. Independently thereof the speed of the positive head 1 may be varied by adjusting the screw 172. The speed of the positive head 1 and the negative head 2 may therefore be varied independently of each other while the motor 4 is running at a constant speed.

I claim:

1. Arc apparatus comprising a metallic housing having a bore to receive the electrode, said housing having an aperture opening into one side of said bore, a pressure shoe in said aperture, a tubular casing, means for securing said casing to said housing, a spring in said casing removed from said shoe, a follower in said casing between said spring and said shoe, and means for varying the tension of said spring.

2. Arc apparatus according to claim 1, wherein said tubular casing is curved away from the arc end of said housing, said follower comprising a series of balls.

3. Arc apparatus comprising an electrode feed casing having a disk of heat insulation, an electrode holder carried by said disk, a pressure shoe in said holder, and a disk of heat insulation carried by said holder in front thereof, said disks and said holder having aligned electrode apertures.

4. Arc apparatus comprising the combination of a base, positive and negative electrode drive shafts spaced apart, a motor on said base between said shafts, a reduction gearing carried by one end of said motor and having a vertical driven shaft, means coupled to said driven shaft for continuously driving said positive electrode drive shaft, and means actuated by said driven shaft for driving said negative electrode drive shaft step by step.

5. Arc apparatus comprising the combination of a base, a constant speed positive electrode drive shaft, a motor on said base, a reduction gearing carried by said motor and having a vertically extending driven shaft directly coupled to said first mentioned shaft, a negative electrode drive shaft, and slip clutch means operated by said driven shaft for coupling said driven shaft to said negative electrode drive shaft.

6. Arc apparatus comprising the combination of a base, a positive electrode drive shaft extending through said base and rotatably mounted therein, a motor beneath said base, a reduction gearing coupled to said motor and having a vertical driven shaft in alignment with said positive electrode drive shaft, a clutch between said last two mentioned shafts, a gear on said positive electrode drive shaft, a stub shaft mounted beneath said base for bodily movement and having a gear engageable with said first mentioned gear, and means responsive to bodily movement of said stub shaft for engaging said gears to manually drive said positive electrode shaft and for operating said clutch to disconnect said driven shaft from said positive electrode drive shaft.

7. Arc apparatus comprising the combination of a base, a positive electrode drive shaft extending through said base and rotatably mounted therein, a motor beneath said base, a reduction gearing coupled to said motor and having a vertical driven shaft in alignment with said positive electrode drive shaft at one end of said motor, a negative electrode drive shaft extending through said base and rotatably mounted therein adjacent the other end of said motor, and means actuated by said driven shaft for rotating said negative electrode drive shaft step by step.

8. Arc apparatus comprising the combination of a base, a motor beneath said base, a reduction gearing coupled to said motor and having a vertically extending driven shaft at one end of said motor, an electrode drive shaft extending through said base at the other end of said motor, and means operatively coupling said driven shaft and said drive shaft.

9. Arc apparatus comprising the combination of a base, a motor beneath said base, a reduction gearing coupled to said motor and having a vertically extending driven shaft, an electrode shaft extending through said base in line with said driven shaft at one end of said motor, a coupling between said electrode shaft and said driven shaft, a second electrode shaft extending through said base at the other end of said motor, means operatively connecting said second electrode shaft and said driven shaft, and means comprising handles at the front of said base for operating each of said electrode shafts for disconnecting its respective electrode shaft from said motor and for manually rotating its respective electrode shaft.

10. Arc apparatus comprising the combination of a base, a motor under said base, a reduction gearing coupled to said motor and having a vertical driven shaft, a positive electrode drive shaft carried by said base in line with said driven shaft at one end of said motor, means for coupling said shafts, an eccentric on said driven shaft, a negative electrode shaft carried by said base at the other end of said motor, a rocker pivoted intermediate its ends, a follower on one end of said rocker for said eccentric, stepping mechanism connecting the other end of said rocker and said negative electrode drive shaft, and an adjustable stop associated with said follower for varying the speed of said negative electrode drive shaft.

11. Arc apparatus comprising the combination of a base, spaced negative and positive drive shafts extending substantially parallel through said base, a motor between said shafts, means associated with each of said shafts for coupling the same to said motor, and means comprising a hand operating device at each end of said motor for operating said coupling means respectively and for manual rotation of said negative and positive drive shafts respectively.

12. Arc apparatus comprising the combination of a base, a motor on said base, a negative electrode drive shaft on said base, a clutch between said motor and said shaft, a gear on said shaft, a stub shaft on said base having a handle, a gear on said stub shaft, a striker arm, means associated with said stub shaft for operating said striker arm, and means associated with said stub shaft for engagement and disengagement of said gears and for operating said clutch.

13. Arc apparatus comprising the combination of a motor, a reduction gearing therefor, a constant speed drive shaft coupled to said gearing, a positive head coupled to said shaft, means associated with said head for adjustably feeding a positive electrode step by step, a step by step rotatable negative electrode drive shaft, a negative head therefor, and a slip clutch associated with said gearing and said negative electrode drive shaft for adjustably driving said negative head step by step.

14. Arc apparatus comprising the combination of a base, a motor on said base, a reduction gearing coupled to said motor and having a vertical driven shaft, a positive electrode drive shaft coupled to said driven shaft, an eccentric on said driven shaft, a negative electrode shaft at the other end of said motor, a rocker pivoted intermediate its ends, a follower on one end of said rocker for said eccentric, stepping mechanism connecting the other end of said rocker and said negative electrode drive shaft, and an adjustable stop associated with said follower for varying the speed of said negative electrode drive shaft.

15. Arc apparatus comprising the combination of a slidable negative head, a support therefor, a step by step rotatable negative electrode drive shaft coupled to said head for feeding the negative electrode, a motor having a slow speed shaft substantially parallel to and spaced from said drive shaft, a slip clutch operatively connecting said slow speed shaft and said negative electrode shaft, and means for adjusting the angular throw of said clutch to vary the negative feed.

16. Arc apparatus comprising the combination of a motor having a slow speed shaft, an eccentric on said shaft, a slip clutch operated by said eccentric, means for varying the throw of said clutch, a negative electrode drive shaft operated by said clutch, a constant speed positive electrode drive shaft coupled to said slow speed shaft, a positive head operated by said positive electrode drive shaft for rotating and longitudinally feeding the positive electrode, and means associated with said positive head for varying the positive feed.

17. Arc apparatus comprising the combination of a positive head, a rotatable electrode carrier therein for advancing the positive electrode, a negative head, a step by step rotatable negative electrode drive shaft for said negative head, a motor, means coupling said motor to said rotatable carrier, one-way clutch means coupled to said motor for actuating said negative electrode drive shaft step by step, means for varying the amount the positive electrode is fed forward for each revolution of said positive electrode carrier, and means comprising an adjustable stop for said clutch for varying the extent of each step of said step by step movement of said negative electrode drive shaft.

HOWARD G. SPEAR.